United States Patent [19]
Kneuer

[11] 3,833,015
[45] Sept. 3, 1974

[54] ELECTROMAGNETIC VALVE
[75] Inventor: Rudolf Kneuer, Walchstadt/Icking, Germany
[73] Assignee: Linde Aktiengesellschaft, Wiesbaden, Germany
[22] Filed: Dec. 4, 1972
[21] Appl. No.: 311,506

[30] Foreign Application Priority Data
Dec. 11, 1971 Germany.............................. 2161605

[52] U.S. Cl.................... 137/334, 251/139, 251/141
[51] Int. Cl............................................ F16k 31/06
[58] Field of Search ............ 251/139, 141; 137/334, 137/340, 338

[56] References Cited
UNITED STATES PATENTS
| | | | |
|---|---|---|---|
| 1,268,913 | 6/1918 | Stout................................... | 251/139 |
| 1,944,113 | 1/1934 | Shenton........................... | 137/338 X |
| 3,231,233 | 1/1966 | Herion................................ | 251/139 |
| 3,523,676 | 8/1970 | Barker................................ | 251/141 |

Primary Examiner—Arnold Rosenthal
Attorney, Agent, or Firm—Karl F. Ross; Herbert Dubno

[57] ABSTRACT

An electromagnetic valve, especially for the control of low-temperature fluids such as cryogens, comprising an inner duct preferably of thermally nonconductive material or of a material weldable to the inner duct of a double-wall pipe line, a valve seat within the duct and a magnetically shiftable body movable within the duct into and out of engagement with the valve seat. The inner duct is spacedly surrounded by an outer duct which, in turn, may be surrounded by the electromagnet coil, the space between the ducts forming an insulator between the electromagnet and the valve members. This space is evacuated and/or filled with a thermally insulating material.

7 Claims, 2 Drawing Figures 3,833,015

ELECTROMAGNETIC VALVE

FIELD OF THE INVENTION

The present invention relates to electromagnetic valves and, more particularly, to magnetic-control valves for the regulation of fluids sensitive to heat transfer.

BACKGROUND OF THE INVENTION

Electromagnetic valves have been provided for many purposes and in many types, depending upon the fluid to be controlled, the cross-section of the valve seat, the nature of the control desired, etc. Of particular interest is the type of electromagnetic valve in which a valve member within a tube is shiftable toward and away from a valve seat, the tube or duct being traversed by a fluid. An electromagnet coil is wound around this pipe and acts, as a solenoid, on the valve member composed in whole or in part of a ferromagnetic material. The coil, depending upon its position with respect to the valve member, can be used to draw the latter away from the valve seat or, alternatively, to urge the valve member against the valve seat. A spring may be provided, in either case, to bias the valve member in the opposite direction.

Electromagnetic valves of this kind are desirable because the fluid is wholly contained and contacts only the movable valve member, the coil being located outside the fluidcarrying duct. However, when attempts have been made to employ such magnetic valves in the control of fluids sensitive to heat transfer, significant disadvantages arise. Firstly, the electromagnet and its interaction with the valve member generate heat which is undesirable when a cold fluid is to be controlled and to be maintained in a particular physical state and/or at a particular temperature. Secondly, the heat losses from the fluid-carrying duct in the region of the coil or the thermal pickup in this region may prove to be a disadvantage.

While the principles of the present invention are applicable to the control of fluids sensitive to a loss of heat, e.g. by conduction, radiation or convection from the fluid-carrying duct, the system is particularly concerned with the control of fluids senstive to a loss of heat, e.g. by conduction, radiation or convection from the fluid-carrying duct, the system is particularly concerned with the control of low-temperature fluids or cryogens. The term "low-temperature fluid" is defined herein to means liquids or gases at temperatures below 0°C and includes liquids and gases which may be cooling agents (circulating coolants), refrigerants or such cryogens as low-temperature gases obtained from or used in gas-rectification plants. Typical cryogens are the liquid oxygen and nitrogen produced in an air-rectification installation, but are also liquid hydrogen, neon and helium.

With such low-temperature fluids, the absorption of heat at a control valve or the like is particularly disadvantageous since it may result in a change of state (from the liquid to the gas) and can only be countered at increased expenditure of energy. As the temperature of the fluid is lower, moreover, the energy necessary to maintain a particular temperature or to compensate for heat gain in the system increases.

In general, therefore, electromagnetic valves for the control of such low-temperature fluids were unsatisfactory under prior-art designs because of the heat transferred to the fluids.

OBJECTS OF THE INVENTION

It is the principal object of the present invention to provide an improved magnetic valve of greater utility and versatility which avoids the disadvantages set forth above.

Another object of the invention is to provide an electromagnetic valve particularly suitable for the control of low-temperature fluids as defined above.

Another object of the invention is the provision of an improved universally applicable fluid-control valve in which heat transfer to and from the control fluid is minimized.

SUMMARY OF THE INVENTION

These objects and others which will become apparent hereinafter are attained, in accordance with the present invention, with a magnetic valve of the general character described wherein, however, a heat-insulating space is provided between the valve member and the magnetic coil.

According to an important feature of the present invention, therefore, an annular insulating compartment is provided between the generally cylindrical electromagnetic coil and the generally cylindrical ferromagnetic member which also serves as the valve closure or is connected thereto. The magnetic valve of the present invention preferably comprises at least one tube or duct traversed by the fluid to be controlled, preferably a liquid cryogen, the tube being connected directly by welding or screw thread in the conduit for the fluid. This tube is formed with the valve seat, preferably at a location close to the magnetic coil. The latter spacedly surrounds the aforementioned tube and duct to define therewith an annular compartment completely surrounding the duct at least over the length of the coil. Where the coil is mounted on a tubular mandrel or other support, the support may be composed of a thermally non-conductive material and/or, the annular or all-around clearance is provided between the tube or duct and the mandrel or support. The outer coil-carrying tube is coaxial with the inner seat-receiving tube which is received with all-around clearance, at least over the length of the coil, within the outer tube.

The magnetic valve of the present invention has been found to completely eliminate the transfer of heat, especially the electric-loss heat generated by the magnetic coil, to the metallic tube or duct within which the valve-closure member is directly located. There is, therefore, between the magnetic coil and the valve-closure member no thermally conductive connection.

The magnetic valve of the present invention can be used, moreover, for the control of fluids traversing ducts which are not composed of ferromagnetic material and may be constituted in whole or in part of thermally insulating material. In this case, the thermal insulation between the interior of the duct and the magnetic coil will be substantially greater.

The magnetic valve of the present invention has been found to be most desirable and satisfactory when used in low-temperature technology, i.e. in highly cooled or supercooled conduits. For example, it may be used to control the flow of low-temperature fluids of an air-rectification installation and/or the control of the flow of low-temperature fluids to and from ducts containing electrical conductors to be operated at superconductive temperatures or thereabove. It may be used to control the flow of refrigerants and, when the term "control" is used herein, it should be noted that the intent is to refer to both control of fluid volume and complete blocking or unblocking of fluid flow. In these low-temperature applications, the magnetic valve of the present invention has the advantage that there is a substantial reduction in the vapor losses from the low-temperature conduit, i.e. a substantial reduction of the quantity of low-temperature liquid which is converted to vapor by heat transfer from the exterior. As a consequence, a considerable reduction in the operating cost of low-temperature installation can be obtained.

According to an important feature of the present invention, the thermally-insulating space is evacuated and/or filled with a thermally-insulating material. The thermally-insulating material is preferably a laminate or multi-layer insulation consisting of reflective layers designed to reduce the radiation-transfer of heat across the space filled with the insulating material. A reflective foil may be provided along a surface of a glass-fiber or other fibrous or porous layer and the composite sheet is wound spirally or nested cylindrically around the inner duct or pipe.

An important feature of the invention resides in the use of two coaxial pipes or ducts to define the insulating space, the electromagnet coil surrounding the outer duct while the inner duct directly conducts the fluid and receives the valve-closure member. The valve seat is provided in the inner duct which may be connected to the fluid conduit traversed by the fluid to be controlled. The latter may also be a double-wall conduit in which the intervening space is evacuated, in which case the inner pipe of the conduit is connected to the inner tube or duct of the valve while the outer wall of the conduit is connected to the outer duct or tube of the present coaxial arrangement. The evacuation of the intervening space may be carried by the insulating means for the pipe line as a whole. The inner tube and the valve seat may thus be composed of the same material as the pipe line and of a material different from the outer tube. Of course, the same material may be used for both the inner and outer tubes. Connection of the pipes or ducts is preferably carried out by welding although other connecting means may be used. Screw-type connections have been found to be advantageous. It should be noted that both the inner and outer tubes of the coaxial arrangement should be selected so that they have little shielding effect on the magnetic field generated by the coil. Suitable metals for this purpose are the light metals such as aluminum.

The valve-closure member is preferably of a cylindrical configuration and is received coaxially within the inner tube. It may be provided with axially extending grooves along its periphery to allow the fluid to pass the valve-closure member. The periphery of the closure member may then slide along the wall of the inner tube.

Advantageously, the generally cylindrical valve-closure member is formed at its end turned toward the valve seat with a ball-shaped or generally spheroidal seat-engaging formation, the latter being preferably disposed upon a substantially frustoconical or converging end portion of the cylindrical body. The ball-shaped or spheroidal configuration of this end of the valve-closure member permits the valve to be closed readily under all conditions, especially when the magnetic field is extinguished, i.e. the coil is de-energized. The ball-shaped configuration also reduces wear and erosion of the seat-engaging end of the valve-closure member, especially when this end is constituted from steel. The entire valve-closure member can, therefore, be composed of steel or of some other ferromagnetic material. If some other ferromagnetic material is used, however, it is preferred to constitute the ball-shaped end from steel.

It has also been found to be advantageous to provide within the inner tube or duct a compression-type coil spring adapted to bias the valve-closure member in the direction of the seat, thereby closing the valve when the magnetic coil is de-energized. When the coil is energized, the magnetic field is effective to lift the valve-closure member from the seat. It will be understood, however, that the magnetic valve can be constructed so that the valve is closed upon energization of the coil and is open in the absence of such energization.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
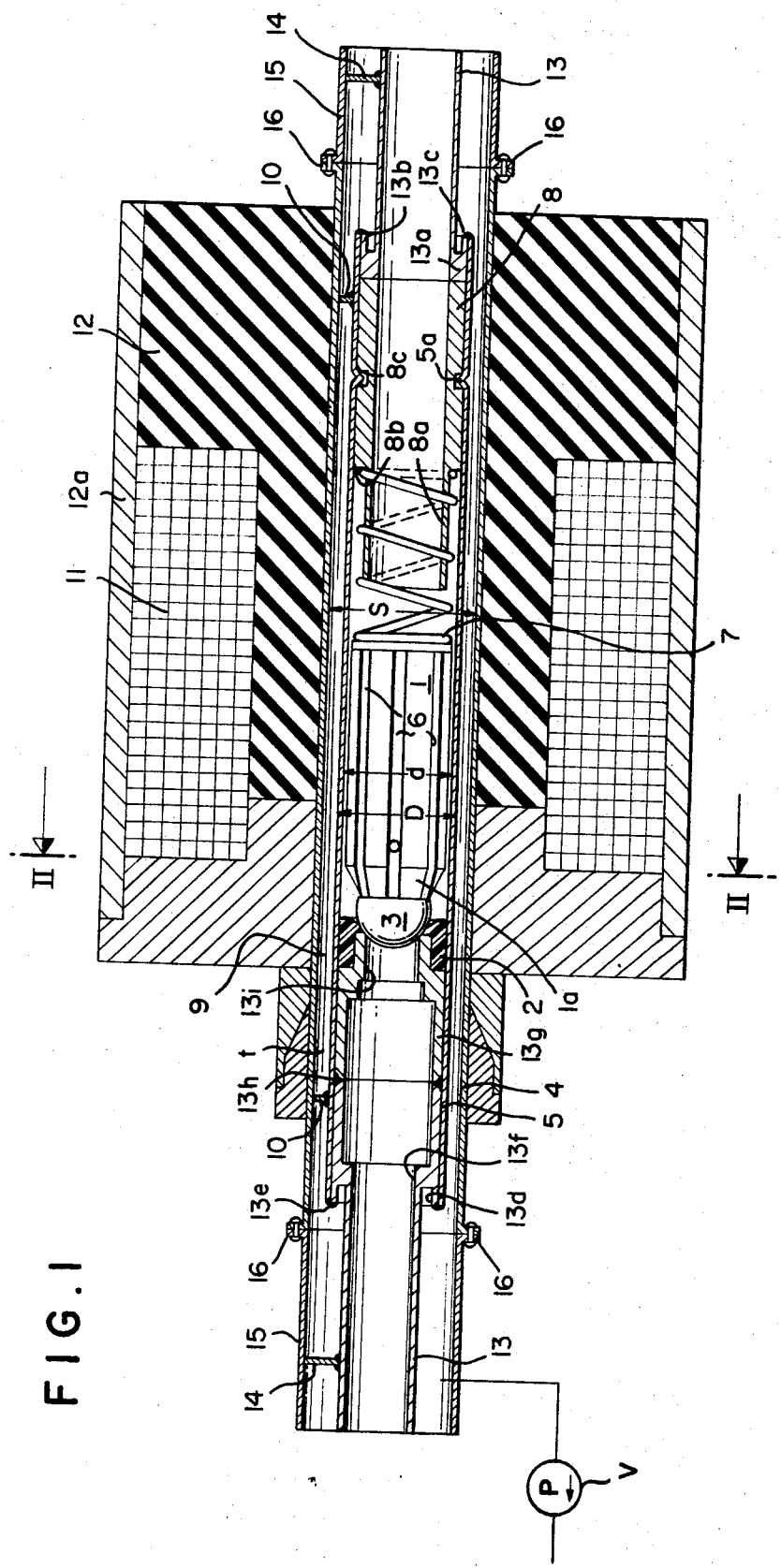
FIG. 1 is an axial cross-sectional view through a valve arrangement according to the present invention, the evacuating for the insulating chamber being illustrated in diagrammatic form.
Figure 2:
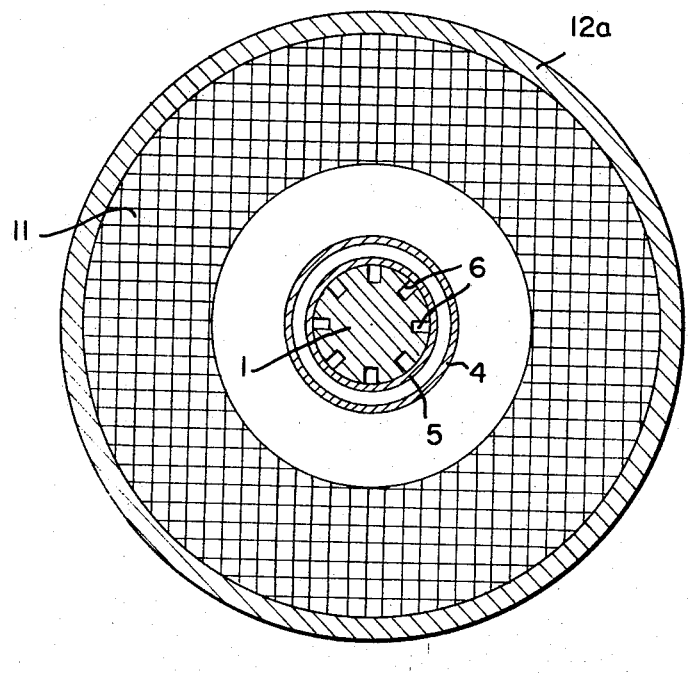
FIG. 2 is a cross-sectional view taken along the line II — II of FIG. 1.

In FIGS. 1 and 2 of the drawing, we have shown a valve arrangement which comprises a generally cylindrical ferromagnetic valve-closure member 1 which is axially shiftable in an inner tube or duct 5 composed of a material which is nonferromagnetic and incapable of blocking a magnetic field produced by an electromagnetic coil 11. The longitudinal axis of the valve-closure member 1 coincides with the longitudinal axis of the inner tube 5. The outer periphery of the valve-closure member 1 engages the inner wall of the tube 5 and the latter is connected at each end with a conduit 13 for the transport of a liquid or gaseous medium, preferably a low-temperature cryogen.

At its right-hand end, the conduit 13 is shown to terminate in a thickened portion 13a having a rearwardly extending coaxial flange 13b to which the end of the tube 5 is butt-welded at 13c. Similarly, the left-hand portion of conduit 13 is formed with a flange 13d to which the corresponding extremity of tube 5 is butt-welded at 13e. The thickened portion 13f of the left-hand conduit 13 also engages a seat-forming member 13g to which it is welded at 13h, the seat-forming member 13g having a boss 13i upon which the synthetic-resin seat 2 is mounted. The seat 2 consists of a low-friction, low-wear material which retains its physical characteristics at low temperatures and may be, for example, polytetrafluoroethylene.

The periphery of the valve-closure member is generally cylindrical, as illustrated in FIG. 1, with an external diameter corresponding to the internal diameter $d$ of the tube 5 less the tolerance required for movement of the valve-closure member 1, e.g. 0.1 to 0.2 mm. To permit the passage of liquid, the valve-closure member 1 is also provided with square cross section axial grooves 6 (see also FIG. 2) which run the full length of the valve-closure member 1 to the smaller-diameter generally spheroidal ball-shaped head 3 of steel, the latter constituting the seating member of the valve. Thus the valve seat 2 is composed of a material which is softer than the wear-resistant head 3. The head 3 is, moreover, formed upon a frustoconically converging portion 1a of the valve-closure member. At the rearward end of the latter a coil-type compression spring 7 is provided to bias the valve-closure member 1 in the direction of the seat 3, the coil spring 7 being centered on a boss 8a of a cylindrical insert and spring seat 8. The latter has a shoulder 8b against which the spring 7 rests and is held in part by the spring action against the left-hand face of the thickened portion 13a of tube 13. An inwardly extending bulge 5a of the tube 5 can also engage in an outwardly open circumferential groove 8c of member 8.

Coaxial with the inner tube 5, and spacedly surrounding same, is a metallic outer tube 4 which may be held in place by spacers 14 or 10 disposed outwardly of the zone surrounded by the electromagnet coil 11. The spacers 14 or 10, spanning the all around clearance 9 between the tubes 4 and 5, are pins which contact the outer tube 4 only at point-like locations. Hence the heat transfer through these pins is minimal.

The electromagnetic coil 11 may be embedded or received in a cylindrical body 12 of ferromagnetic material and can be surrounded by a layer 12a of similar or different, also insulating, material, the body 12 having a minimal effect upon the magnetic field generated by coil 11 at the ferromagnetic body 1. The width of the clearance 9 is one half (S — D) where S is the inner diameter of the outer tube 4 and D is the outer diameter of the inner tube 5. This gap perferably has a thickness of 2.5 mm ± 0.5 mm and it has been found to be advantageous to maintain the gap width independent of the internal diameter $d$ of the inner tube. The space 9 is thermally insulating as noted above and can be evacuated, e.g. by the vacuum pump connected to the space surrounding the conduit 13 and used for insulating of this member. It acts as a heat barrier between the interior and exterior tubes and consequently prevents heat from the electromagnet from reaching the interior of the tube 5 and the fluid conducted therethrough. The tube 4 is flanged at its ends 16 and bolted to the corresponding flanges of the outer tube 15 of the conduit system 13 which is held in place within the outer ducts by spacers 14.

When the coil 11 is energized, the ferromagnetic body 1 is shifted to the right (FIG. 1) away from the seat 2 against the force of spring 7 to unblock the pipe. Tubes 4 and 5 are composed of a metal which does not affect the magnetic field (e.g. copper) and, when the coil is de-energized, the spring 7 simply returns the valve-closure member 1 to its seat 2. The spaces between the tubes 13 and 15 are also insulated and evacuated as illustrated.

I claim:

1. An electromagnetic valve for a conduit carrying a heat-transfer-sensitive fluid, comprising a tube connected in said conduit and traversed by said fluid; means forming a valve seat in said tube; a magnetically shiftable member received in said tube and engageable with said seat; and electromagnetic coil surrounding said tube; means forming a heat-insulating clearance all around said tube and between said tube and said coil for insulating said member from said coil; and means for evacuating said clearance.

2. The valve defined in claim 1 wherein said means forming said clearance includes an outer tube coaxially and spacedly surrounding the first-mentioned tube, said coil surrounding said outer tube.

3. The valve defined in claim 2 wherein said member is generally cylindrical and is coaxially received in said first-mentioned tube, said member being provided along its periphery with a plurality of axially extending grooves traversed by said fluid.

4. The valve defined in claim 3 wherein said member has an end turned toward said seat and of generally spheroidal configuration.

5. The valve defined in claim 4, further comprising a coil spring received within said first-mentioned tube and biasing said member in the direction of said seat.

6. The valve defined in claim 5 wherein said seat is formed from polytetrafluoroethylene and at least said end of said member is composed of steel.

7. The valve defined in claim 6 wherein said end of said member frustoconically converges in the direction of said seat and is provided with a ball-shaped head composed of steel.

* * * * *